H. M. PETZOLD.
ADJUSTABLE SEAT FOR AGRICULTURAL IMPLEMENTS.
APPLICATION FILED JUNE 7, 1918.
1,288,165.
Patented Dec. 17, 1918.
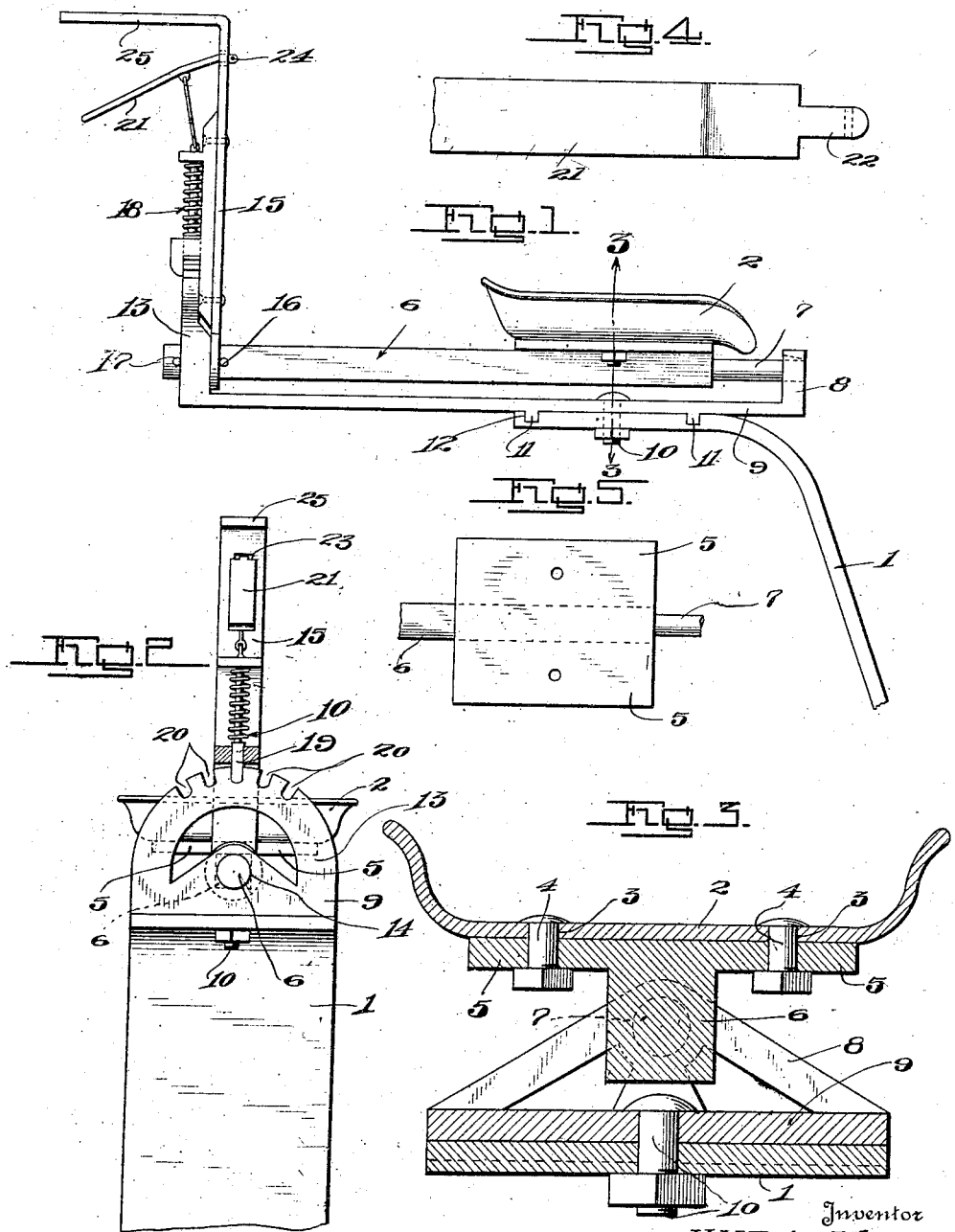
Inventor
H. M. Petzold,
By Lancaster and Allwine
his Attorneys

UNITED STATES PATENT OFFICE.

HAROLD M. PETZOLD, OF PORTLAND, OREGON.

ADJUSTABLE SEAT FOR AGRICULTURAL IMPLEMENTS.

1,288,165.  Specification of Letters Patent.  Patented Dec. 17, 1918.

Application filed June 7, 1918. Serial No. 238,712.

*To all whom it may concern:*

Be it known that I, HAROLD M. PETZOLD, a citizen of the United States, and a resident of Portland, in the county of Multnomah and State of Oregon, have invented certain new and useful Improvements in Adjustable Seats for Agricultural Implements, of which the following is a specification.

This invention relates to seats for use upon agricultural implements and an object of the invention is to provide a rockable or adjustable support for the seat of an implement to permit the seat to be adjusted to remain in a horizontal position, upon tilting of the implement, such as would be occasioned by the travel of the implement along a hillside, or over rolling and uneven ground.

In using agricultural implements on hillsides, or inclined or rolling ground, the seats, which are connected to the implement supporting frame by the usual type of spring or resilient standards inclined in accordance with the inclining of the implement and the rider must twist his body to remain erect, resulting in an uncomfortable position and the cramping of one side of the driver and it is an object of this invention to provide a seat construction whereby the angle of the seat may be quickly and easily adjusted at the desires of the persons sitting thereon and also to provide means for holding the seat in adjusted position.

A further object of this invention is to provide an attachment for permitting the adjustment of the angle of the seat of an agricultural implement, which may be applied to the usual spring standards, and employ the usual seat, making it adaptable for use with any and all types of agricultural implements now in use.

Other objects of the invention will appear in the following detailed description, taken in connection with the accompanying drawing, forming a part of this specification, and in which drawing:

Figure 1 is a side elevation of the seat attachment.

Fig. 2 is an end elevation of the seat attachment.

Fig. 3 is a section on the line 3—3 of Fig. 1.

Fig. 4 is a fragmentary plan of a lever used in the construction of the seat structure.

Fig. 5 is a top plan of the attaching plate to which the seat is attached.

Referring more particularly to the drawing, 1 designates the usual spring standard used to support the seat 2 of an agricultural implement. In the present invention, the seat 2 is disconnected from the standard 1 and drilled to form bolt receiving openings 3. Bolts 4 extend through the openings 3 and through the laterally extending projection 5 of a rockable member 6 for detachably connecting the seat 2 to the rockable member. The rockable member 6 is rectangular-shaped in cross section throughout the major portion of its length and it has its forward end reduced and circular in cross section, as shown at 7 being rotatably seated in the upstanding ear 8 of a bracket 9 which bracket is attached to the upper end of the standard 1 by a bolt 10 and held against pivotal movement with respect to the standard by ribs 11 which engage in recesses 12 formed in the upper surface of the upper horizontal end of the standard.

The bracket 9 has its rear end upturned, forming an upstanding end portion 13 the upper edge of which is curved concentrically of the center of the rockable member 6, the rear end of which rockable member is circular in cross section and rotatably seated in a suitable opening 14 formed in the upstanding end 13.

A lever 15 mounted upon the rockable member 6 near its rear end and confined thereon, by a suitable transversely extending pin 16, while a second pin 17 is inserted through the circular rear end of the rockable member and engages against the outer surface of the upstanding end 13 to prevent endwise movement of the member 6 within its journals in the upstanding ends of the bracket 9.

The lever 15 carries the usual type of dog mechanism, indicated at 18, the pawl 19 of which is adapted for seating in any one of a plurality of notches 20 formed in the curved upper edge of the upstanding end 13 for holding the lever 15 in adjusted position and consequently holding the rockable member 6 and the seat 2 which is attached thereto in various adjusted positions. An actuating lever 21 for the dog mechanism is provided which lever has a reduced tongue 22 formed upon one end of the same. The tongue 22 extends through an opening 23 in the lever 15, and is confined therein for pivotal movement, by a suitable pin 24 which extends transversely through the outer end of the tongue 22. The lever 21 is adapted for movement toward the hand grip 25 of the lever 15 for moving the pawl 19 of the dog mechanism out of one of the notches 20 to permit pivotal movement of the lever 15.

When it is desired to adjust the angle of the seat 2, the lever 21 is first moved toward the hand grip 25 of the lever 15 for moving the pawl 19 out of any one of the notches 20 after which the lever is rocked, for rocking the rockable member 6 to tilt the seat 2 as desired and when the desired adjustment of the seat has been obtained, the lever 21 may be released and the dog mechanism 18 will act to move the pawl 19 into one of the notches 20 for holding the lever 15, rockable member 6 and seat 2 against accidental tilting movement.

From the foregoing description, taken in connection with the drawing, it will be apparent that a support for the ordinary seat of an agricultural implement has been provided, by means of which the seat may be tilted or adjusted to any transverse angle desired or necessary, and furthermore that such an attachment has been provided which may be used in connection with the ordinary seat supporting standard and seat now commonly employed in agricultural implements.

Having fully described the invention, what is claimed is:

1. The combination with an ordinary seat supporting standard, of a bracket carried by the standard, a seat supporting member rockably carried by the bracket, a rocking lever carried by the rockable member, locking means carried by the lever and the bracket to lock the rockable member in adjusted position, and means carried by said lever for releasing said locking means.

2. The combination with an ordinary seat supporting standard having a pair of spaced recesses in its upper surface, of a bracket, lugs formed upon said bracket and seated in said recess, a rockable member carried by said bracket, a seat carried by said rockable member, and means carried by said rockable member and bracket to lock the rockable member in adjusted position.

3. The combination with an ordinary seat supporting standard, of a bracket carried by the standard, a seat supporting member rockably carried by the bracket, a rocking lever carried by the rockable member, a quadrant formed upon said bracket, and a dog mechanism carried by said lever for co-action with said quadrant to lock the rockable member in adjusted position.

4. The combination with the ordinary seat supporting spring standard of an agricultural implement, of a bracket detachably carried by said standard, the ends of said bracket being upturned, a quadrant formed upon one of said upturned ends, a rockable member having its ends journaled in the upturned bracket end, means for preventing endwise movement of the rockable member with respect to the bracket, a pair of laterally extending extensions formed upon said rockable member near its forward end, a seat resting upon and attached to said extensions, a lever mounted upon said rockable member, and a dog mechanism carried by said lever for co-action with said quadrant to hold the rockable member in adjusted position.

HAROLD M. PETZOLD.

Copies of this patent may be obtained for five cents each, by addressing the "Commissioner of Patents, Washington, D. C."